US012784945B2

(12) United States Patent
Ito et al.

(10) Patent No.: US 12,784,945 B2
(45) Date of Patent: Nov. 3, 2026

(54) PRODUCTION METHOD OF RARE EARTH MAGNET

(71) Applicant: TOYOTA JIDOSHA KABUSHIKI KAISHA, Toyota (JP)

(72) Inventors: Masaaki Ito, Anjo (JP); Noritsugu Sakuma, Mishima (JP); Akihito Kinoshita, Mishima (JP); Reimi Tabuchi, Nisshin (JP); Tomonori Inuzuka, Toyota (JP); Kunihiro Matsuyama, Okazaki (JP); Masashi Harada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 373 days.

(21) Appl. No.: 18/124,306

(22) Filed: Mar. 21, 2023

(65) Prior Publication Data

US 2023/0317327 A1 Oct. 5, 2023

(30) Foreign Application Priority Data

Mar. 31, 2022 (JP) ................................. 2022-061125

(51) Int. Cl.
*H01F 1/053* (2006.01)
*B22F 3/14* (2006.01)

(52) U.S. Cl.
CPC .............. *H01F 1/0536* (2013.01); *B22F 3/14* (2013.01); *B22F 2202/05* (2013.01); *B22F 2301/355* (2013.01)

(58) Field of Classification Search
CPC .. B22F 1/17; B22F 2202/05; B22F 2301/355; B22F 2998/10; B22F 3/10; B22F 3/14;
(Continued)

(56) References Cited

U.S. PATENT DOCUMENTS 5,173,206 A * 12/1992 Dickens, Jr. .......... H01F 1/0572 524/401
2004/0112467 A1* 6/2004 Mino ........................ B22F 3/02 148/108

(Continued)

FOREIGN PATENT DOCUMENTS

JP S58-030107 A 2/1983
JP S61-119006 A 6/1986

(Continued)

OTHER PUBLICATIONS

Liu S. “Magnetic alignment in powder magnet processing.” 1994. J. appl. phys. 76. p. 6757-6759. (Year: 1994).*

*Primary Examiner* — Nicholas A Wang
(74) *Attorney, Agent, or Firm* — Oliff PLC

(57) ABSTRACT

A production method of a Sm—Fe—N-based rare earth magnet, enabling to stably impart sufficient anisotropy, is provided.
The present disclosure provides a production method of a rare earth magnet, including preparing a raw material powder containing a magnetic powder (SmFeN powder 10) having a magnetic phase which contains Sm, Fe and N and at least partially has a crystal structure of at least either $Th_2Zn_{17}$ type or $Th_2Ni_{17}$ type, and pressure-sintering the raw material powder. In this production method, magnetic orientation is imparted to the raw material powder by applying a magnetic field before the pressure sintering, and the application of magnetic field is continued to maintain the magnetic orientation at least until the middle of the pressure sintering.

5 Claims, 4 Drawing Sheets

(58) Field of Classification Search
CPC . C22C 2202/02; H01F 1/0536; H01F 1/0557; H01F 1/0596
See application file for complete search history.

(56) References Cited

U.S. PATENT DOCUMENTS

| | | | | |
|---|---|---|---|---|
| 2008/0315701 | A1 | 12/2008 | Inoue et al. | |
| 2017/0178773 | A1* | 6/2017 | Ozeki | B22F 3/1021 |
| 2021/0272751 | A1 | 9/2021 | Ichigozaki et al. | |

FOREIGN PATENT DOCUMENTS

| | | | | |
|---|---|---|---|---|
| JP | H01-202805 | A | | 8/1989 |
| JP | 2005039089 | | * | 2/2005 |
| JP | 2006-332155 | A | | 12/2006 |
| JP | 2009-050075 | A | | 3/2009 |
| JP | 2017193773 | | * | 10/2017 |
| JP | 2020-053440 | A | | 4/2020 |
| JP | 2020161704 | | * | 10/2020 |
| JP | 2021-136347 | A | | 9/2021 |
| JP | 2021-141121 | A | | 9/2021 |
| WO | 2015/199096 | A1 | | 12/2015 |

* cited by examiner

PRODUCTION METHOD OF RARE EARTH MAGNET

FIELD

The present disclosure relates to a production method of a rare earth magnet. More specifically, the present disclosure relates to a production method of a rare earth magnet having a magnetic phase which contains Sm, Fe and N and at least partially has a crystal structure of at least either $Th_2Zn_{17}$ type or $Th_2Ni_{17}$ type.

BACKGROUND

As a high-performance rare earth magnet, a Sm—Co-based rare earth magnet and a Nd—Fe—B-based rare earth magnet have been put into practical use, but recently, rare earth magnets other than these are being studied.

For example, a rare earth magnet containing Sm, Fe and N (hereinafter sometimes referred to as "Sm—Fe—N-based rare earth magnet") is being studied. The Sm—Fe—N-based rare earth magnet is produced, for example, using a magnetic powder containing Sm, Fe and N (hereinafter sometimes referred to as "SmFeN powder").

The SmFeN powder has a magnetic phase at least partially having a crystal structure of at least either $Th_2Zn_{17}$ type or $Th_2Ni_{17}$ type. In this magnetic phase, N is considered as forming an interstitial solid solution in a Sm—Fe crystal. Consequently, N is likely to be dissociated by heat to cause decomposition of the SmFeN powder. For this reason, the Sm—Fe—N-based rare earth magnet is often produced by molding a SmFeN powder with use of a resin and/or rubber, etc.

Other methods for producing a Sm—Fe—N-based rare earth magnet include a method of pressure-sintering a powder containing a SmFeN powder. The sintering method is roughly divided into pressureless sintering and pressure sintering. In either method, a high-density rare earth magnet (sintered body) is obtained by sintering. In the pressureless sintering method, a pressure is not applied to the magnetic powder, and therefore, in order to obtain a high-density sintered body, it is common practice to sinter the magnetic powder at a high temperature of 900° C. or more for a long time of 6 hours or more. On the other hand, in pressure sintering, since the magnetic powder is sintered by applying a pressure thereto, a high-density sintered body is generally obtained, even when the magnetic powder is sintered at a low temperature of 400 to 700° C. for a short time of 0.1 to 5 hours. For this reason, in the case of using a SmFeN powder as the magnetic powder, pressure sintering is employed so as to avoid the above-described decomposition.

At the time of molding the SmFeN powder, in the case of employing pressure sintering, in order to impart anisotropy to the sintered body, it is known to obtain a magnetic-field molded body before pressure sintering by compression-molding a SmFeN powder-containing powder in a magnetic field and pressure-sinter the magnetic-field molded body.

For example, PTL 1 discloses a method for obtaining an in-field molded body by sandwiching a SmFeN powder-containing powder between permanent magnets and compression-molding the powder. In the present description, unless otherwise indicated, an action to obtain a green compact by compression-molding a magnetic powder in a magnetic field is referred to as an "in-field molding", and the green compact obtained by magnetic-field molding is referred to as an "in-field molded body".

CITATION LIST

Patent Literature

[PTL 1] Japanese Unexamined Patent Publication No. 2021-141121 (JP2021-141121A)

SUMMARY

Technical Problem

The SmFeN powder has a very high anisotropy field and therefore, in order to let the SmFeN powder in the magnetic-field molded body be sufficiently magnetically orientated, it has been considered necessary to apply a strong magnetic field to the SmFeN-containing powder. However, even when an in-field molded body obtained by applying a strong magnetic field is pressure-sintered, desired anisotropy is sometimes not obtained.

The method of PTL 1 is intended to perform in-field molding by a simple apparatus when the in-field molding is performed at a high temperature not decomposing the magnetic phase in the SmFeN powder. The reason therefor is that at a high temperature not decomposing the magnetic phase in the SmFeN powder, the anisotropy field of the SmFeN powder is reduced and this is considered to be advantageous to in-field molding. However, even when, according to the method of PTL 1, in-field molding is performed at a high temperature not decomposing the magnetic phase in the SmFeN powder and the in-field molded body is pressure-sintered, desired anisotropy is sometimes not obtained.

The present disclosure has been made to solve the problem above. More specifically, an object of the present disclosure is to provide a production method of a Sm—Fe—N-based rare earth magnet, in which sufficient anisotropy can be stably imparted.

Solution to Problem

The present inventors have made many intensive studies to attain the object above and have accomplished the production method of a rare earth magnet of the present disclosure. The production method of a rare earth magnet of the present disclosure includes the following embodiments.

<1> A production method of a rare earth magnet, including:

preparing a raw material powder containing a magnetic powder having a magnetic phase which contains Sm, Fe and N and at least partially has a crystal structure of at least either $Th_2Zn_{17}$ type or $Th_2Ni_{17}$ type, and pressure-sintering the raw material powder, wherein magnetic orientation is imparted to the raw material powder by applying a magnetic field before the pressure sintering, and the application of magnetic field is continued to maintain the magnetic orientation at least until the middle of the pressure sintering.

<2> The production method of a rare earth magnet according to item <1>, wherein the magnetic field is applied in a direction different from the pressure direction of the pressure sintering.

<3> The production method of a rare earth magnet according to item <1> or <2>, wherein the magnetic field is applied by a permanent magnet.

<4> The production method of a rare earth magnet according to any one of items <1> to <3>, wherein the raw material powder further contains a zinc component-containing powder.

<5> The production method of a rare earth magnet according to any one of items <1> to <4>, wherein a zinc component-containing coating is formed on the particle surface of the magnetic powder.

<6> The production method of a rare earth magnet according to any one of items <1> to <5>, wherein a green compact is formed before the pressure sintering by compression-molding the raw material powder while applying a magnetic field and the green compact is pressure-sintered.

<7> The production method of a rare earth magnet according to any one of items <1> to <6>, wherein the application of magnetic field is continued to maintain the magnetic orientation until the pressure sintering is completed.

Advantageous Effects of Invention

According to the present disclosure, a raw material powder containing a SmFeN powder having magnetic orientation imparted by applying a magnetic field is pressure-sintered while continuing the application of a magnetic field at least until the middle of the pressure sintering, and the magnetic orientation of the SmFeN powder can thereby be maintained. Consequently, according to the present disclosure, a production method of a Sm—Fe—N-based rare earth magnet, enabling to stably impart sufficient anisotropy, can be provided.

DESCRIPTION OF EMBODIMENTS

Embodiments of the production method of a rare earth magnet of the present disclosure are described in detail below. Incidentally, the embodiments described below should not be construed to limit the production method of a rare earth magnet of the present disclosure.

Although not bound by theory, the reason why according to the production method of a rare earth magnet of the present disclosure, sufficient anisotropy can be stably imparted to the rare earth magnet (product), is described below using the drawings.

Figure 1:
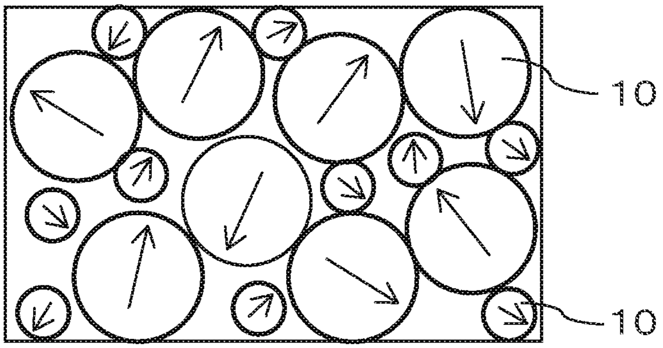
FIG. 1 is an explanatory diagram schematically illustrating the magnetic state of the SmFeN powder before applying a magnetic field.
Figure 2:
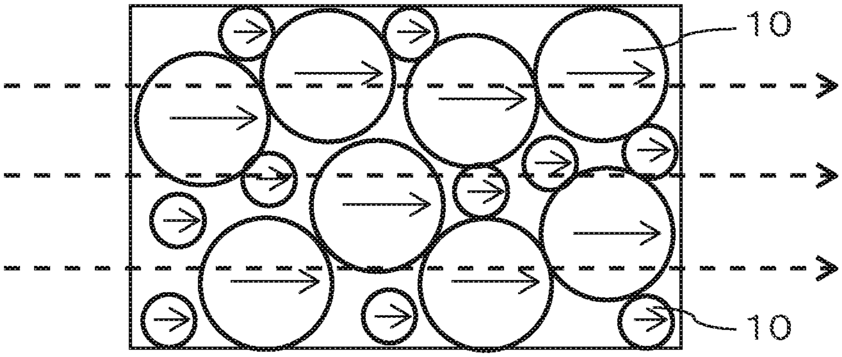
FIG. 2 is an explanatory diagram schematically illustrating the magnetic state of the SmFeN powder during the application of magnetic field.
Figure 3:
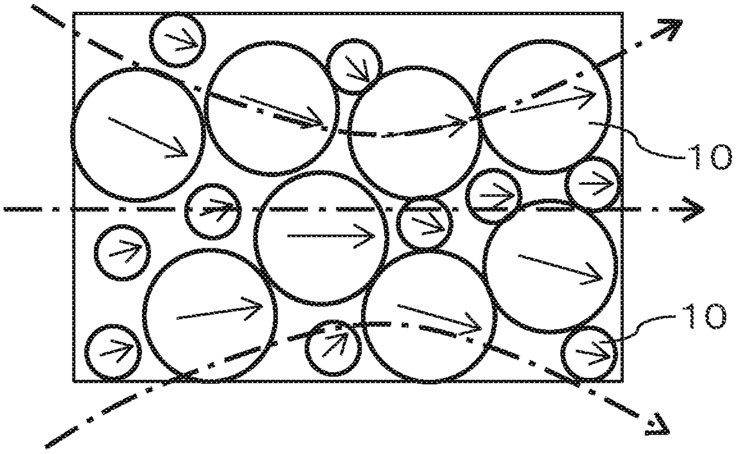
FIG. 3 is an explanatory diagram schematically illustrating, regarding a SmFeN powder that is magnetically oriented by applying a magnetic field, the magnetic state of the SmFeN powder after the application of magnetic field is released.
Figure 4:
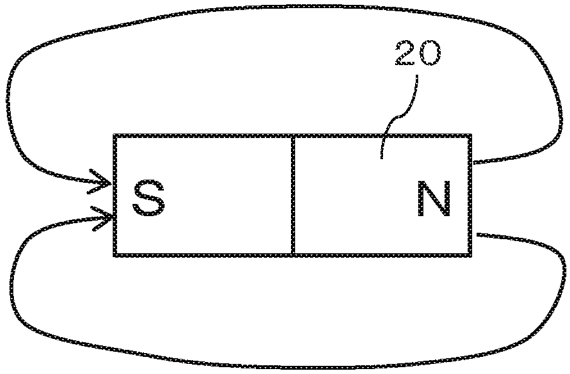
FIG. 4 is an explanatory diagram schematically illustrating the magnetic field emitted by a bar-shaped permanent magnet.

FIG. 1 is an explanatory diagram schematically illustrating the magnetic state of the SmFeN powder before applying a magnetic field. FIG. 2 is an explanatory diagram schematically illustrating the magnetic state of the SmFeN powder during the application of magnetic field. FIG. 3 is an explanatory diagram schematically illustrating, regarding a SmFeN powder that is magnetically oriented by applying a magnetic field, the magnetic state of the SmFeN powder after the application of magnetic field is released. In FIGS. 1 to 3, solid arrows denote respective magnetic directions of particles of the SmFeN powder. Also, FIG. 4 is an explanatory diagram schematically illustrating the magnetic field emitted by a bar-shaped permanent magnet.

As illustrated in FIG. 1, respective particles of the SmFeN powder 10 before applying a magnetic field are not magnetically oriented. When a magnetic field is applied to the SmFeN powder in such a state, as illustrated in FIG. 2, respective particles of the SmFeN powder 10 are magnetically oriented in the direction of magnetic field applied. In FIG. 2, the dashed arrow denotes the direction of magnetic field applied to the SmFeN powder 10. At this time, the entire SmFeN powder 10 acts as one bar-shaped permanent magnet. As illustrated in FIG. 4, the bar-shaped permanent magnet 20 forms a magnetic field denoted by solid arrow. When the application of a magnetic field to the SmFeN powder 10 is maintained, it is easy to cancel the magnetic field denoted by the solid line of FIG. 4, and respective particles of the SmFeN powder 10 can maintain the magnetic orientation illustrated in FIG. 2.

However, when the application of magnetic field is released, as illustrated in FIG. 3, respective particles of the SmFeN powder 10 lose their magnetic orientation. This occurs because the oriented SmFeN powder 10 as a whole forms a magnetic field like that of a bar-shaped permanent magnet denoted by solid arrow of FIG. 4 and in turn, falls into the same state as in the case of applying a magnetic field denoted by alternate long and short dash line of FIG. 3 to respective particles of the SmFeN powder 10. In the following description, the magnetic field denoted by alternate long and short dash line of FIG. 3 is sometime referred to as "magnetic field formed by the entire SmFeN powder".

For avoiding the above-described disturbing magnetic orientation, it may be considered to remove the magnetic force remaining in the SmFeN powder, e.g., by AC demagnetizing (sometimes referred to as AC degaussing) the SmFeN powder. However, AC demagnetization takes time. Also, even when subjected to AC demagnetization, it is difficult to completely remove the magnetic force remaining in the SmFeN powder. Even if the magnetic force remaining in the SmFeN powder can be completely removed by AC demagnetization, a small but certain magnetic field formed by the entire SmFeN powder is generated until the removal of magnetic force is completed. This confirms that it is difficult to completely avoid disturbing the magnetic orientation.

Then, the present inventors have found that in order to preclude respective particles of the SmFeN powder from losing the orientation due to a magnetic field formed by the entire SmFeN powder particles, application of a magnetic field should be continued until interbonding among particles of the SmFeN powder develops. The reason therefor is considered because interbonding force between particles of the SmFeN powder inhibits a magnetic field formed by the entire SmFeN powder from rotating respective particles of the once-oriented SmFeN powder. Interbonding among particles of the SmFeN powder develops by the middle of pressure sintering of the SmFeN powder at earliest and by the completion of pressure sintering of the SmFeN powder at latest. Based on this knowledge, the present inventors have found that application of a magnetic field should be continued at least until the middle of pressure sintering of the SmFeN powder, preferably until the completion of pressure sintering of the SmFeN powder. Sufficient anisotropy can thereby be stably imparted to the sintered body.

In the present description, unless otherwise indicated, the degree of orientation is calculated in the following manner. In a magnetization-magnetic field curve, denoting as M(1T) the magnetization when the magnetic field is 1T, and as M(8T) when the magnetic field is 8T, the degree of orientation is calculated by M(1T)/M(8T). Denoting as M(0T) the magnetization when the magnetic field is 0T, M(0T) is not used instead of M(1T) in the formula above, so that in the case of a sample having a very small coercive force, even if the magnetization is decreased over the degree of orientation due to the effect of self-demagnetizing field (self-demagnetization field), the degree of orientation can be evaluated.

The constituent features of the production method of a rare earth magnet of the present disclosure accomplished based on the knowledge, etc. discussed hereinabove are described below.

<<Production Method>>

The production method of a rare earth magnet of the present disclosure (hereinafter, sometimes simply referred to as "production method of the present disclosure") includes a raw material powder preparation step and a pressure sintering step.

<Raw Material Powder Preparation Step>

A raw material powder is prepared. The raw material powder contains a SmFeN powder. The SmFeN powder is described below.

<SmFeN Powder>

The SmFeN powder for use in the production method of the present disclosure is not particularly limited as long as it has a magnetic phase containing Sm, Fe and N and at least partially having a crystal structure of at least either $Th_2Zn_{17}$ type or $Th_2Ni_{17}$ type. The crystal structure of the magnetic phase includes a phase having a $TbCu_7$-type crystal structure, etc., in addition to the above-described structures. Note that Sm is samarium, Fe is iron, and N is nitrogen. Also, Th is thorium, Zn is zinc, Ni is nickel, Tb is terbium, and Cu is copper.

The SmFeN powder may have, for example, a magnetic phase represented by composition formula $(Sm_{(1-i)}R_i)_2(Fe_{(1-j)}Co_j)_{17}N_h$. The rare earth magnet (hereinafter, sometimes referred to as "product") obtained by the production method of the present disclosure develops magnetization derived from the magnetic phase in the SmFeN powder. Here, i, j, and h denote molar ratios.

The magnetic phase in the SmFeN powder may contain R within a range not impairing the effects of the production method of the present disclosure and the magnetic properties of the product. This range is represented by i in the composition formula above. i may be, for example, 0 or more, 0.10 or more, or 0.20 or more, and may be 0.50 or less, 0.40 or less, or 0.30 or less. R is one or more selected from rare earth elements other than Sm, and Zr. In the present description, the rare earth elements are Sc, Y, La, Ce, Pr, Nd, Pm, Sm, Eu, Gd, Tb, Dy, Ho, Er, Tm, Yb, and Lu. Incidentally, Zr is zirconium, Sc is scandium, Y is yttrium, La is lanthanum, Ce is cerium, Pr is praseodymium, Nd is neodymium, Pm is promethium, Sm is samarium, Eu is europium, Gd is gadolinium, Tb is terbium, Dy is dysprosium, Ho is holmium, Er is erbium, Tm is thulium, Yb is ytterbium, and Lu is lutetium.

With respect to $Sm_{(1-i)}R_i)_2(Fe_{(1-j)}Co_j)_{17}N_h$, typically, R is substituted at the position of Sm in $Sm_2(Fe_{(1-j)}Co_j)_{17}N_h$, but the configuration is not limited thereto. For example, part of R may be interstitially disposed in $Sm_2(Fe_{(1-j)}Co_j)_{17}N_h$.

The magnetic phase in the SmFeN powder may contain Co within a range not impairing the effects of the production method of the present disclosure and the magnetic properties of the product. This range is represented by j in the composition formula above. j may be 0 or more, 0.10 or more, or 0.20 or more, and may be 0.52 or less, 0.50 or less, 0.40 or less, or 0.30 or less.

With respect to $(Sm_{(1-i)}R_i)_2(Fe_{(1-j)}Co_j)_{17}N_h$, typically, Co is substituted at the position of Fe of $(Sm_{(1-i)}R_i)_2Fe_{17}N_h$, but the configuration is not limited thereto. For example, part of Co may be interstitially disposed in $(Sm_{(1-i)}R_i)_2Fe_{17}N_h$.

N interstitially exists in the crystal grain represented by $(Sm_{(1-i)}R_i)_2(Fe_{(1-j)}Co_j)_{17}$, and the magnetic phase in the SmFeN powder thereby contributes to the development and enhancement of the magnetic properties.

With respect to $(Sm_{(1-i)}R_i)_2(Fe_{(1-j)}Co_j)_{17}N_h$, h may be from 1.5 to 4.5, but typically, the configuration is $(Sm_{(1-i)}$ $i)_2(Fe_{(1-j)}Co_j)_{17}N_3$·h may be 1.8 or more, 2.0 or more, or 2.5 or more, and may be 4.2 or less, 4.0 or less, or 3.5 or less. The content of $(Sm_{(1-i)}R_i)_2(Fe_{(1-j)}Co_j)_{17}N_3$ relative to the entire $(Sm_{(1-i)}R_i)_2(Fe_{(1-j)}Co_j)_{17}N_h$ is preferably 70 mass % or more, more preferably 80 mass % or more, still more preferably 90 mass %. On the other hand, $(Sm_{(1-i)}R_i)_2(Fe_{(1-j)}Co_j)_{17}N_h$ need not entirely be $(Sm_{(1-i)}R_i)_2(Fe_{(1-j)}Co_j)_{17}N_3$. The content of $(Sm_{(1-i)}R_i)_2(Fe_{(1-j)}Co_j)_{17}N_3$ relative to the entire $(Sm_{(1-i)}R_i)_2(Fe_{(1-j)}Co_j)_{17}N_h$ may be 98 mass % or less, 95 mass % or less, or 92 mass % or less.

The SmFeN powder may contain, in addition to the magnetic phase represented by $(Sm_{(1-i)}R_i)_2(Fe_{(1-j)}Co_j)_{17}N_h$, oxygen and $M^1$ as well as unavoidable impurity elements within a range substantially not impairing the effects of the production method of the present disclosure and the magnetic properties of the product. From the viewpoint of ensuring the magnetic properties of the product, the content of the magnetic phase represented by $(Sm_{(1-i)}R_i)_2(Fe_{(1-j)}Co_j)_{17}N_h$ relative to the entire SmFeN powder may be 80 mass % or more, 85 mass % or more, or 90 mass % or more. On the other hand, even when the content of the magnetic phase represented by $(Sm_{(1-i)}R_i)_2(Fe_{(1-j)}Co_j)_{17}N_h$ relative to the entire SmFeN powder is not set excessively high, there is practically no problem. Accordingly, the content may be 97 mass % or less, 95 mass % or less, or 93 mass % or less. The remainder of the magnetic phase represented by $(Sm_{(1-i)}R_i)_2(Fe_{(1-j)}Co_j)_{17}N_h$ corresponds to the content of oxygen and $M^1$. Also, part of oxygen and $M^1$ may be interstitially and/or substitutionally present in the magnetic phase.

$M^1$ is one or more selected from Ga, Ti, Cr, Zn, Mn, V, Mo, W, Si, Re, Cu, Al, Ca, B, Ni, and C. The unavoidable impurity element indicates an impurity element that is inevitably included at the time of production, etc. of a raw material and/or a magnetic powder or causes a significant rise in the production cost for avoiding its inclusion. Such an element may be substitutionally and/or interstitially present in the above-described magnetic phase or may be present in a phase other than the magnetic phase. Alternatively, the unavoidable impurity element may be present at the grain boundary between such phases. Incidentally, Ga is gallium, Ti is titanium, Cr is chromium, Zn is zinc, Mn is manganese, V is vanadium, Mo is molybdenum, W is tungsten, Si is silicon, Re is rhenium, Cu is copper, Al is aluminum, Ca is calcium, B is boron, Ni is nickel, and C is carbon.

As long as there is no adverse effect on the pressure sintering, the particle diameter of the SmFeN powder is not particularly limited. The particle diameter of the SmFeN powder may be, for example, in terms of $D_{50}$, 1 μm or more, 2 μm or more, 3 μm or more, 4 μm or more, 5 μm or more, 6 μm or more, 7 μm or more, 8 μm or more, or 9 μm or more, and may be 20 μm or less, 19 μm or less, 18 μm or less, 17 μm or less, 16 μm or less, 15 μm or less, 14 μm or less, 13 μm or less, 12 μm or less, 11 μm or less, or 10 μm or less.

$D_{50}$ of the SmFeN powder is calculated from the particle size distribution of the SmFeN powder. Also, the particle size distribution of the SmFeN powder is measured (examined) by the following method. In the present description, unless otherwise indicated, the description regarding the particle size (particle diameter) of the SmFeN powder is based on the following measurement method (examination method). Incidentally, $D_{50}$ means the median diameter.

A sample obtained by filling the SmFeN powder with a resin is prepared, and the surface of the sample is polished and observed by an optical microscope. Then, straight lines are drawn on the optical microscope image, the lengths of line segments formed by sectioning the straight lines with the SmFeN particles (bright field) are measured, and the particle size distribution of the SmFeN powder is determined from the frequency distribution of the lengths of the line segments. The particle size distribution determined by this method is substantially equal to the particle size distribution determined by the linear intercept method or dry laser diffraction scattering method.

From the viewpoint of enhancing the coercive force, the oxygen content in the SmFeN powder is preferably lower relative to the entire SmFeN powder. The oxygen content in the SmFeN powder is preferably 2.0 mass % or less, more preferably 1.5 mass % or less, still more preferably 1.0 mass % or less, relative to the entire SmFeN powder. On the other hand, an extreme reduction in the content of oxygen in the SmFeN powder involves an increase in the production cost. For this reason, the content of oxygen in the SmFeN powder may be 0.1 mass % or more, 0.2 mass % or more, or 0.3 mass % or more, relative to the entire SmFeN powder.

As long as those discussed above, etc. are satisfied, the production method of the SmFeN powder is not particularly limited, and a commercially available product may be used as well.

In the production method of the present disclosure, the raw material powder may further contain a zinc component-containing powder, in addition to the SmFeN powder. Oxygen in the above-described SmFeN powder is absorbed by the zinc component-containing powder, so that the magnetic properties, particularly the coercive force, of the product can be enhanced. For this reason, the content of oxygen in the SmFeN powder may be determined in consideration of the amount of oxygen in the SmFeN powder that the zinc component-containing powder absorbs in the production process. In addition, the zinc component-containing powder increases the interbonding force between particles of the SmFeN powder, as a result, the SmFeN powder is more precluded from losing its orientation. The zinc component-containing powder is described below.

<Zinc Component-Containing Powder>

The zinc component-containing powder, typically, contains at least either metallic zinc or zinc alloy. The metallic zinc means zinc that is not alloyed. Particles of the SmFeN powder are bonded and modified by the zinc component. Also, in the case where the SmFeN powder particles include fine particles, the zinc component-containing powder eliminates the adverse effect of fine particles on magnetic properties. The fine particle means particles having a particle diameter of 1.0 μm or less.

The zinc component-containing powder enables the SmFeN powder particles to more strongly bond to each other. In addition, at the time of pressure sintering, part of the zinc component diffuses to the surface of the SmFeN powder particle to form a Fe—Zn alloy phase. On the surface of the SmFeN powder particle, the crystal structure such as $Th_2Zn_{17}$ type and/or $Th_2Ni_{17}$ type is not complete in some portions, and in such portions, an α-Fe phase is present and gives rise to a reduction in the coercive force. The a-Fe phase forms a Fe—Zn alloy phase together with the zinc component and suppresses the reduction in the coercive force. More specifically, Fe and Zn interdiffuse between the SmFeN powder particles and the zinc component-containing powder particles and form a Fe—Zn alloy phase. That is, the zinc component-containing powder has a function as a modifier, in addition to the function as a binder.

In the SmFeN powder, fine particles are sometimes present. In the fine particle, the proportion of a portion where the crystal structure such as $Th_2Zn_{17}$ type and/or $Th_2Ni_{17}$ type is not complete is large and in turn, the proportion of α-Fe phase is high. Therefore, fine particles give rise to a reduction in the magnetic properties, particularly, in the coercive force. During pressure sintering, many of a-Fe phases derived from fine particles and the zinc component-containing powder form a Fe—Zn alloy phase not only on the particle surface but also almost throughout the particle. It is considered that many of Fe—Zn alloy phases derived from fine particles are then integrated with Fe—Zn alloy phases formed on the surface of SmFeN particles having a relatively large particle diameter (particles except for fine particles). Consequently, the zinc component-containing powder eliminates the adverse effect of fine particles regarding the reduction in magnetic properties, particularly, in the coercive force.

The content ratio of the zinc component in the raw material powder may be appropriately determined so that the binder function, modification function and function of eliminating adverse effect of fine particles can be advantageously achieved. The content ratio of the zinc component in the raw material powder is preferably, relative to the entire raw material powder, 1 mass % or more, 3 mass % or more, 6 mass % or more, 7 mass % or more, or 8 mass % or more, because the above-described functions are advantageously achieved. On the other hand, the content ratio of the zinc component in the raw material powder is preferably, relative to the total of the SmFeN powder and the zinc component-containing powder, 30 mass % or less, 25 mass % or less, 20 mass % or less, 15 mass % or less, or 10 mass % or less, because a reduction in magnetization due to use of the zinc component-containing powder can be suppressed.

As described above, the zinc component-containing powder contains, typically, at least either metallic zinc or zinc alloy. When the zinc alloy is represented by $Zn\text{-}M^2$, an element that is alloyed with Zn (zinc) to drop the melting start temperature of the zinc alloy below the melting point of Zn, and an unavoidable impurity element may be selected as $M^2$. In this case, the sinterability in the pressure sintering step is enhanced. $M^2$ that drops the melting start temperature below the melting point of Zn includes an element, etc. that forms a eutectic alloy between Zn and $M^2$. Such $M^2$ includes, typically, for example, Sn, Mg, Al, and a combination of these. Sn is tin, Mg is magnesium, and Al is aluminum. An element that does not inhibit the melting point dropping action of these elements as well as the properties of the product can also be selected as $M^2$. Also, the unavoidable impurity element indicates an impurity element that is inevitably included or causes a significant rise in the production cost for avoiding its inclusion, such as impurities contained in raw materials of the zinc component-containing powder.

In the zinc alloy represented by Zn-$M^2$, the ratios (molar ratios) of Zn and $M^2$ may be appropriately determined to give an appropriate sintering temperature. The ratio (molar ratio) of $M^2$ to the entire zinc alloy may be, for example, 0.05 or more, 0.10 or more, or 0.20 or more, and may be 0.90 or less, 0.80 or less, 0.70 or less, 0.60 or less, 0.50 or less, 0.40 or less, or 0.30 or less.

The zinc component-containing powder may optionally contain, other than the metallic zinc and/or zinc alloy, a substance having a binder function and/or a modification function as well as other functions, within a range not impairing the effects of the present invention. Other functions include, for example, a function of enhancing corrosion resistance.

The particle diameter of the zinc component-containing powder is not particularly limited but is preferably smaller than the particle diameter of the SmFeN powder. This facilitates spreading of particles of the zinc component-containing powder between particles of the SmFeN powder. The particle diameter of the zinc component-containing powder may be, for example, in terms of $D_{50}$ (median diameter), 0.1 μm or more, 0.5 μm or more, or 1.0 μm or more, and may be 12.0 μm or less, 11.0 μm or less, 10.0 μm or less, 9.0 μm or less, 8.0 μm or less, 7.0 μm or less, 6.0 μm or less, 5.0 μm or less, 4.0 μm or less, or 2.0 μm or less. Also, the particle diameter $D_{50}$ (median diameter) of the zinc component-containing powder is measured, for example, by a dry laser diffraction scattering method.

When the oxygen content of the zinc component-containing powder is small, much oxygen in the SmFeN powder can be advantageously absorbed. From this viewpoint, the oxygen content of the zinc component-containing powder is preferably 5.0 mass % or less, more preferably 3.0 mass % or less, and still more preferably 1.0 mass % or less, relative to the entire zinc component-containing powder. On the other hand, an increase in the production cost is involved in extremely reducing the oxygen content of the zinc component-containing powder. For this reason, the oxygen content of the zinc component-containing powder may be 0.1 mass % or more, 0.2 mass % or more, or 0.3 mass % or more, relative to the entire zinc component-containing powder.

In the case where the raw material powder contains a zinc component-containing powder, in addition to the SmFeN powder, the mixing method of the SmFeN powder and the zinc component-containing powder is not particularly limited. The mixing method includes methods of mixing the powders by means of a mortar, a muller wheel mixer, an agitator mixer, a mechanofusion, a V-type mixer, and/or a ball mill, etc. These methods may also be combined. Here, the V-type mixer is an apparatus having a container formed by connecting two cylindrical containers in V shape, in which when the containers are rotated, the powders in the containers are caused to repeatedly experience aggregation and separation due to gravity and centrifugal force and thereby mixed.

In place of the zinc component-containing powder or in combination with the zinc component-containing powder, a zinc component-containing coating may be formed on part or all of particle surfaces of the SmFeN powder in the raw material powder. The zinc component-containing coating is described below.

<Zinc Component-Containing Coating>

A zinc component-containing coating may be formed on particle surfaces of the SmFeN powder in the raw material powder. This can provide the same actions and effects as in the case where the raw material powder contains a zinc component-containing powder in addition to the SmFeN powder.

As for the zinc component-containing coating, the zinc component-containing coating may be formed on part of particle surfaces of the SmFeN powder, or the zinc component-containing coating may be formed on all of particle surfaces of the SmFeN powder. The phrase "the zinc component-containing coating is formed on part of particle surfaces of the SmFeN powder" means that the zinc component-containing coating is formed on the surface of part of particles out of all particles of the SmFeN powder. The phrase "the zinc component-containing coating is formed on all of particle surfaces of the SmFeN powder" means that regarding the SmFeN powder, the zinc component-containing coating is formed on the surface of substantially all particles. The "substantially all particles" means that for the reason related to the formation method of the zinc component-containing coating, a very small number of particles on which the zinc component-containing coating is not formed by necessity may be present.

The formation of the zinc component-containing coating on part or all of particle surfaces of the SmFeN powder in the raw material powder may be achieved using an alternative to a zinc component-containing powder or using a zinc component-containing powder in combination. The "alternative to a zinc component-containing powder" means that the raw material powder contains substantially no zinc component-containing powder and a zinc component-containing coating is formed on part or all of particle surfaces of the SmFeN powder. The "contains substantially no" means that for reasons related to apparatus, etc., the raw material powder may contain a very small amount of zinc component-containing powder at the time of its preparation. Also, "using a zinc component-containing powder in combination" means that the raw material powder contains a zinc component-containing powder, in addition to the SmFeN powder, and a zinc component-containing coating is formed on part or all of particle surfaces of the SmFeN powder. Here, in the present description, unless otherwise indicated, a powder in which a zinc component-containing coating is formed on the particle surface of the SmFeN powder is sometimes referred to as "coated magnetic powder". In the production method of the present disclosure, as the raw material powder, at least either a mixed powder of SmFeN powder and zinc component-containing powder or a coated magnetic powder in which a zinc component-containing coating is formed on the particle surface of the SmFeN powder may be prepared.

The method for forming a zinc component-containing coating on the particle surface of the SmFeN powder is not particularly limited but includes, for example, a method using a rotary kiln furnace, a vapor deposition method, etc. Each of these methods is described briefly.

<Method Using Rotary Kiln Furnace>

Figure 5:
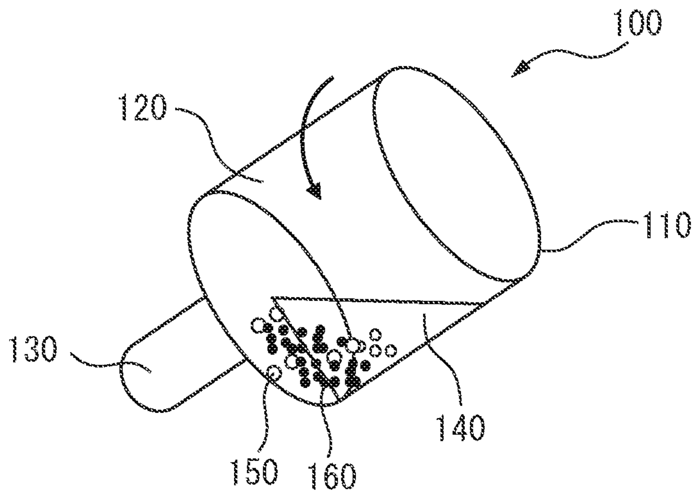
FIG. 5 is an explanatory diagram illustrating one example of the method for forming a zinc component-containing coating on the particle surface of the SmFeN powder by using a rotary kiln furnace.

FIG. 5 is an explanatory diagram illustrating one example of the method for forming a zinc component-containing coating on the particle surface of the SmFeN powder by using a rotary kiln furnace.

A rotary kiln furnace 100 has a stirring drum 110. The stirring drum 110 has a material storing part 120, a rotary shaft 130, and a stirring plate 140. To the rotary shaft 130, a rotary unit (not shown) such as electric motor is connected.

A SmFeN powder 150 and a zinc component-containing powder 160 are charged into the material storing part 120. Thereafter, the material storing part 120 is heated by a heater (not shown) while rotating the stirring drum 110.

When the material storing part 120 is heated at a temperature lower than the melting point of the zinc component-containing powder 160, a zinc component of the zinc component-containing powder 160 undergoes solid-phase diffusion to the particle surface of the SmFeN powder 150. As a result, a zinc component-containing coating is formed on the particle surface of the SmFeN powder 150. When the material storing part 120 is heated at a temperature of the melting point of the zinc component-containing powder 160 or higher, a melt of the zinc component-containing powder 160 is obtained and when the melt is brought into contact with the SmFeN powder 150 and the material storing part 120 is cooled in this state, a zinc component-containing coating is formed on the particle surface of the SmFeN powder 150.

The operation conditions of the rotary kiln furnace may be appropriately determined so that a desired coating can be obtained.

Denoting as T the melting point of the zinc component-containing powder, the heating temperature of the material storing part may be, for example, (T−50°) C. or more, (T−40°) C. or more, (T−30°) C. or more, (T−20°) C. or more, (T−10°) C. or more, or T° C. or more, and may be (T+50°) C. or less, (T+40°) C. or less, (T+30°) C. or less, (T+20°) C. or less, or (T+10°) C. or less. Here, in the case where the zinc component-containing powder is a powder containing metallic zinc, T is the melting point of zinc. Also, in the case where the zinc component-containing powder is a powder containing a zinc alloy, T is the melting point of the zinc alloy.

The rotational speed (number of rotations) of the stirring drum may be, for example, 5 rpm or more, 6 rpm or more, 10 rpm or more, or 20 rpm or more, and may be 200 rpm or less, 100 rpm or less, or 50 rpm or less. The atmosphere during rotation is preferably an inert gas atmosphere so as to prevent oxidation of the powder, the coating formed, etc. The inert gas atmosphere encompasses an argon gas atmosphere and/or a nitrogen gas atmosphere. The stirring drum rotation time (coating treatment time) may be appropriately determined so that a desired zinc component-containing coating can be formed. The stirring drum rotation time (coating treatment time) may be, for example, 1 minute or more, 5 minutes or more, 10 minutes or more, 15 minutes or more, 30 minutes or more, 45 minutes or more, or 60 minutes or more, and may be 240 minutes or less, 210 minutes or less, 180 minutes or less, 150 minutes or less, 120 minutes or less, or 90 minutes or less.

After a zinc component-containing coating is formed on the particle surface of the SmFeN powder, if the particles are bonded to each other, the bonded body may be pulverized. The pulverization method is not particularly limited and includes, for example, a method of pulverizing the bonded body by means of a ball mill, a jaw crusher, a jet mill, a cutter mill, or a combination thereof.

<Vapor Deposition Method>

Figure 6:
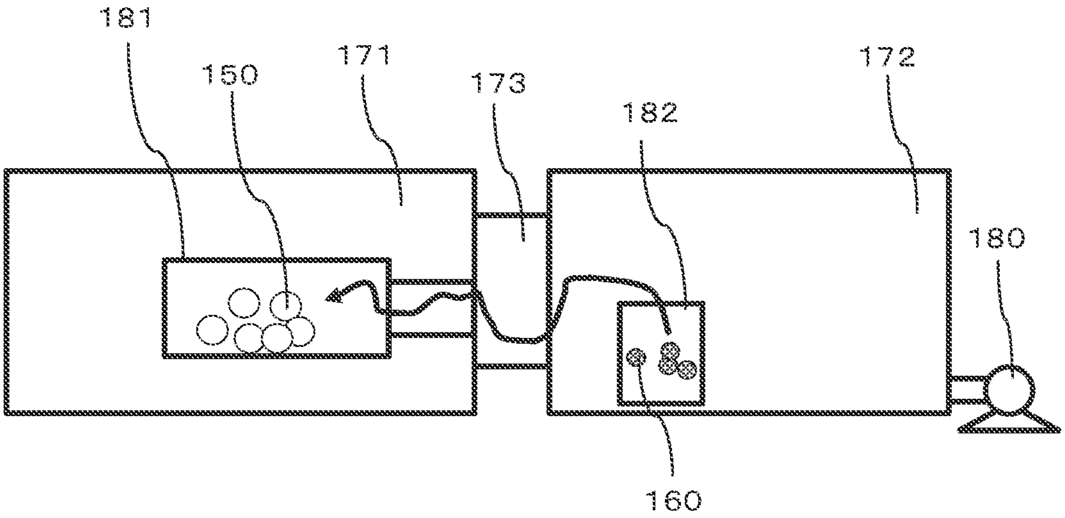
FIG. 6 is an explanatory diagram illustrating one example of the method for forming a zinc component-containing coating on the particle surface of the SmFeN powder by a vapor deposition method.

FIG. 6 is an explanatory diagram illustrating one example of the method for forming a zinc component-containing coating on the particle surface of the SmFeN powder particle by a vapor deposition method.

A SmFeN powder 150 is stored in a first container 181, and a zinc component-containing powder 160 is stored in a second container 182. The first container 181 is stored in a first heat-treatment furnace 171, and the second container 182 is stored in a second heat-treatment furnace 172. The first heat-treatment furnace 171 and the second heat-treatment furnace 172 are connected via a connection path 173. The first heat-treatment furnace 171, the second heat-treatment furnace 172, and the connection path 173 have air-tightness, and a vacuum pump 180 is connected to the second heat-treatment furnace 172.

After the insides of the first heat-treatment furnace 171, second heat-treatment furnace 172 and connection path 173 are depressurized by the vacuum pump 180, the insides are heated. Then, a zinc component-containing vapor evaporates from the zinc component-containing powder 160 stored in the second container 182. As denoted by solid arrow in FIG. 6, the zinc-containing vapor moves from the inside of the second container 182 to the inside of the first container 181. The zinc-containing vapor having moved to the inside of the first container 181 is cooled to form (deposit) a coating on the particle surface of the SmFeN powder 150.

When a rotary container is used for the first container 181, the container can work as a rotary kiln furnace, and the coverage rate of the coating formed on the particle surface of the SmFeN powder 150 can further be increased. The coverage rate is described later.

Various conditions in forming the coating by the method illustrated in FIG. 6 may be appropriately determined so that a desired coating can be obtained.

The temperature of the first heat-treatment furnace (heating temperature of the SmFeN powder) may be, for example, 120° C. or more, 140° C. or more, 160° C. or more, 180° C. or more, 200° C. or more, or 220° C. or more, and may be 300° C. or less, 280° C. or less, or 260° C. or less.

Denoting as T the melting point of the zinc component-containing powder, the temperature of the second heat-treatment furnace (heating temperature of the zinc component-containing powder) may be, for example, T° C. or more, (T+20°) C. or more, (T+40°) C. or more, (T+60°) C. or more, (T+80°) C. or more, (T+100°) C. or more, or (T+120°) C. or more, and may be (T+200°) C. or less, (T+180°) C. or less, (T+160°) C. or less, or (T+140°) C. or less. Here, in the case where the zinc component-containing powder is a powder containing metallic zinc, T is the melting point of zinc. Also, in the case where the zinc component-containing powder is a powder containing a zinc alloy, T is the melting point of the zinc alloy. In the second container, a bulk material containing zinc component may be stored, but from the viewpoint of rapidly melting the charge material in the second container and generating a zinc component-containing vapor from the melt, it is preferable to store the zinc component-containing powder in the second container.

The first heat-treatment furnace and second heat-treatment furnace are set to a reduced-pressure atmosphere so as to promote generation of a zinc component-containing vapor and prevent oxidation of the powder, coating formed, etc. The ambient pressure is, for example, preferably $1 \times 10^{-5}$ MPa or less, more preferably $1 \times 10^{-6}$ MPa or less, still more preferably $1 \times 10^{-7}$ MPa or less. On the other hand, even if the pressure is not excessively reduced, there is practically no problem, and as long as the above-described ambient pressure is satisfied, the ambient pressure may be $1 \times 10^{-8}$ MPa or more.

In the case where the first container is a rotary container, the rotational speed (number of rotations) thereof may be, for example, 5 rpm or more, 10 rpm or more, or 20 rpm or more, and may be 200 rpm or less, 100 rpm or less, or 50 rpm or less.

In the vapor deposition method as well, after a zinc component-containing coating is formed on the particle surface of the SmFeN powder, if the particles are bonded to each other, the bonded body may be pulverized. The pulverization method is not particularly limited and includes, for example, a method of pulverizing the bonded body by means of a ball mill, a jaw crusher, a jet mill, a cutter mill, or a combination thereof.

<Coverage Rate of Zinc Component>

In the case of forming a zinc component-containing coating on the particle surface of the SmFeN powder, the coverage rate thereof is preferably higher. Because, when the coverage rate is high, modification of the particle surface of the SmFeN powder with a zinc component-containing coating during pressure sintering is facilitated, and the coercive force is advantageously enhanced. Next, the method for determining the coverage rate is described.

The coverage rate of the zinc component is a proportion (percentage) of the area covered by the zinc component relative to the entire particle surface of the SmFeN powder subjected to the formation of a zinc component-containing coating. The coverage rate (%) is determined as follows.

With respect to the SmFeN powder after a zinc component-containing coating is formed, the composition informations on the constituent elements of the SmFeN powder and zinc component-containing coating are acquired using X-ray Photoelectron Spectroscopy (XPS). Then, the coverage rate (%) is calculated according to the following formula.

Coverage rate (%)=[(sum of composition informations on respective constituent elements of zinc component-containing coating)/{(sum of composition informations on respective constituent elements of SmFeN powder)+(sum of composition informations on respective constituent elements of zinc component-containing coating)}]×100

In the case where the SmFeN powder is composed of, for example, Sm, Fe, and N, the sum of composition informations on respective constituent elements of the SmFeN powder means the sum of respective composition informations on Sm, Fe, and N. Even when the SmFeN powder contains an element other than Sm, Fe and N, the content ratio of the element other than Sm, Fe and N is small. Accordingly, even if the SmFeN powder contains an element other than Sm, Fe and N, the sum of composition informations on respective constituent elements of the SmFeN powder can be approximated by the sum of respective composition informations on Sm, Fe and N. Also, in the case where the zinc component-containing coating is, for example, a metallic zinc coating, the sum of the composition informations on respective constituent elements of the zinc component-containing coating means the composition information on Zn. In the case where the zinc component-containing coating is, for example, a zinc alloy coating, the sum of composition informations on respective constituent elements of the zinc component-containing coating means the sum of respective composition informations on Zn and alloy element. In the case where the zinc alloy is, for example, a Zn—Al alloy, the sum of composition informations on respective constituent elements of the zinc component-containing coating means the sum of respective composition informations on Zn and Al.

For example, the composition information on Zn means the mass abundance of Zn determined from the peak intensity of XPS spectrum obtained by measuring XPS spectrum of the SmFeN powder after the formation of zinc component-containing coating. In the case where the SmFeN powder is composed of, for example, Sm, Fe and N and the zinc component-containing coating is, for example, a metallic zinc coating, the coverage rate (%) is calculated as follows.

Coverage rate (%)=(mass abundance of Zn)/(sum of mass abundances of Sm, Fe, N and Zn)×100

The thus-determined coverage rate is preferably 80% or more, 85% or more, 90% or more, or 95% or more, and ideally 100%.

As described above, the zinc component-containing coating means, typically, a coating containing at least either metallic zinc or zinc alloy. When the zinc alloy is represented by Zn-$M^2$, an element that is alloyed with Zn (zinc) to drop the melting start temperature of the zinc alloy below the melting point of Zn, and an unavoidable impurity element may be selected as $M^2$. In this case, the sinterability in the later-described pressure sintering step is enhanced. $M^2$ that drops the melting start temperature of the zinc alloy below the melting point of Zn includes an element, etc. that forms a eutectic alloy between Zn and $M^2$. Such $M^2$ includes, typically, for example, Sn, Mg, Al, and a combination of these. Sn is tin, Mg is magnesium, and Al is aluminum. An element that does not inhibit the melting point dropping action of these elements as well as the properties of the product can also be selected as $M^2$. Incidentally, the unavoidable impurity element indicates an impurity element that is inevitably included or causes a significant rise in the production cost for avoiding its inclusion, such as impurities contained in raw materials of the zinc component-containing powder.

In the zinc alloy represented by Zn-$M^2$, the ratios (molar ratios) of Zn and $M^2$ may be appropriately determined to give an appropriate pressure sintering temperature. The ratio (molar ratio) of $M^2$ to the entire zinc alloy may be, for example, 0.05 or more, 0.10 or more, or 0.20 or more, and may be 0.90 or less, 0.80 or less, 0.70 or less, 0.60 or less, 0.50 or less, 0.40 or less, or 0.30 or less.

The zinc component-containing powder used in the above-described "method using a rotary kiln furnace" and "vapor deposition method" may optionally contain, in addition to the metallic zinc and/or zinc alloy, a substance having a binder function and/or a modification function and other functions, as long as the effects of the present invention are not impaired. Other functions include, for example, a function of enhancing corrosion resistance.

Even in the case of forming a zinc component-containing coating on the particle surface of the SmFeN powder in the raw material powder, the content ratio of the zinc component in the raw material powder follows the content ratio of the zinc component in the raw material powder when the raw material powder contains a zinc component-containing powder as well as the SmFeN powder. In the case of using a zinc component-containing powder in combination for the formation of zinc component-containing coating, the content ratio of the zinc component in the raw material powder is the content ratio of the total of the zinc component derived from the zinc component-containing coating and the zinc component derived from the zinc component-containing powder.

<Pressure Sintering Step>

The raw material powder is pressure-sintered. Before pressure sintering, a magnetic field is applied to the raw material powder so as to previously impart magnetic orientation to the SmFeN powder in the raw material powder. Application of a magnetic field to the raw material powder is continued at least until the middle of pressure sintering, preferably until the completion of pressure sintering. This allows the SmFeN powder in the sintered body to be sufficiently oriented, as a result, sufficient anisotropy can be imparted to the sintered body (rare earth magnet).

As long as a magnetic field can be applied to the raw material powder as described above, the magnetic field application method is not particularly limited, but a preferable magnetic field application method is described below.

<Magnetic Field Application Method>

Figure 7:
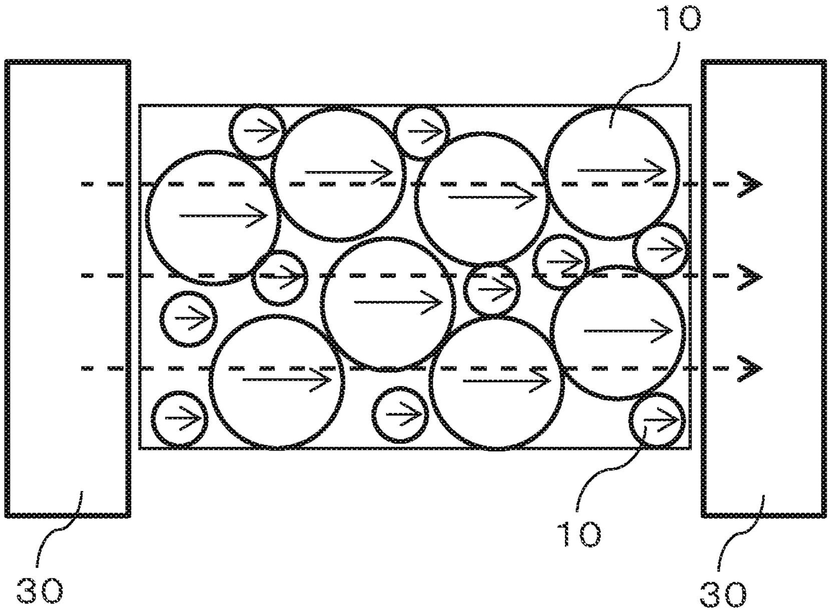
FIG. 7 is an explanatory diagram illustrating one example of the magnetic field application method.

FIG. 7 is an explanatory diagram illustrating one example of the magnetic field application method, but the present disclosure is not limited thereto. In the method illustrated in FIG. 7, a magnetic field generating source 30 is disposed around SmFeN powder 10. Particles of the zinc component-containing powder may be present between particles of the SmFeN powder 10, a zinc component-containing coating may be formed on the particle surface of the SmFeN powder, or these may be present in combination. More specifically, the magnetic field generating source 30 may be disposed around the raw material powder. The dashed line denotes a magnetic field applied to the SmFeN powder.

The magnitude of the magnetic field applied may be, for example, 500 kA/m or more, 1,000 kA/m or more, 1,500 kA/m or more, or 1,600 kA/m or more, and may be 20,000 kA/m or less, 15,000 kA/m or less, 10,000 kA/m or less, 5,000 kA/m or less, 3,000 kA/m or less, or 2,000 kA/m or less.

The magnetic field generating source 30 includes, for example, an electromagnetic coil and/or a permanent magnet, etc. These may also be used in combination. The combination use is described in detail later. In the production method of the present disclosure, a magnetic field is applied during pressure sintering as well. At the time of pressure sintering, the raw material powder needs to be heated and pressurized, and therefore the pressure sintering apparatus is likely to be complicated and increased in size. From the viewpoint of constructing the periphery of the pressure sintering apparatus as a simple structure, the magnetic field generating source is preferably a permanent magnet.

In the case of using an electromagnetic coil as the magnetic field generating source 30, a static magnetic field or a pulsed magnetic field using an alternating current can be applied.

In the case of using a permanent magnet as the magnetic field generating source 30, the permanent magnet includes, for example, an alnico magnet, a ferrite magnet, and/or a rare earth magnet, etc. From the viewpoint of reducing the installation space and applying a strong magnetic field, a rare earth magnet is preferred. The rare earth magnet includes, for example, a samarium-cobalt magnet (Sm—Co-based magnet) and/or a neodymium magnet (Nd—Fe—B-based magnet), etc. The raw material powder and the periphery thereof have a relatively low temperature at the start of pressure sintering but are gradually subjected to high temperature. Therefore, from the viewpoint of applying a magnetic field to the raw material powder for as long time as possible during pressure sintering, for example, a samarium-cobalt magnet having a high Curie temperature is preferred. Also, the applied magnetic field may be increased by arranging a soft magnetic material in the vicinity of the permanent magnet. The soft magnetic material includes, for example, permalloy, silicon steel plate, and permendur, etc. These may also be used in combination. From the viewpoint of increasing the applied magnetic field, permendur is preferred. The "vicinity" means a position at which the magnetic field generated by the permanent magnet can be increased.

In the case of using, as the magnetic field generating source 30, an electromagnetic coil and a permanent magnet in combination, this includes, for example, the following embodiment. A permanent magnet before magnetization is arranged at the position of the magnetic field generating source 30 of FIG. 7. An electromagnetic coil is further arranged outside the permanent magnet, and a magnetic field is applied to both the permanent magnet and the SmFeN powder 10 by the electromagnetic coil. Then, the permanent magnet is magnetized by the magnetic field applied by the electromagnetic coil, and respective particles of the SmFeN powder 10 are oriented. When the application of magnetic field by the electromagnetic coil is started before pressure sintering, even if the application of magnetic field by the electromagnetic coil is thereafter stopped before pressure sintering, the application of magnetic field to the SmFeN powder 10 can be continued using the magnetized permanent magnet.

In order to suppress oxidation of the raw material powder, the magnetic field is preferably applied in an inert gas atmosphere. The inert gas atmosphere encompasses an argon gas atmosphere and/or a nitrogen gas atmosphere.

<Magnetic Field Application Direction>

Figure 8:
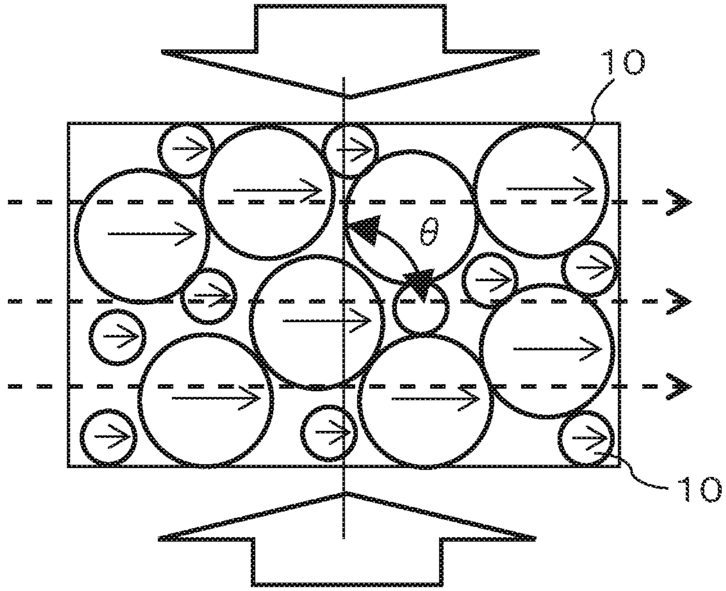
FIG. 8 is an explanatory diagram illustrating one example of the magnetic field application direction.

The magnetic field application direction is not particularly limited, but it is preferable to apply the magnetic field in a direction different from the pressure direction of pressure sintering. The reason therefor is described using the drawing. FIG. 8 is an explanatory diagram illustrating one example of the magnetic field application direction. In FIG. 8, the dashed arrow denotes the direction of magnetic field applied to the SmFeN powder 10, and the open arrow denotes the pressure sintering direction. The phrase "apply the magnetic field in a direction different from the pressure direction of pressure sintering" means that in FIG. 8, the angle θ between the pressure direction and the magnetic field application direction (provided that $0° \leq \theta \leq 90°$) is not 0°. In FIG. 8, particles of the zinc component-containing powder may be present between particles of the SmFeN powder 10, a zinc component-containing coating may be formed on the particle surface of the SmFeN powder, or these may be present in combination.

As described above, in the magnetically oriented SmFeN powder, the entire SmFeN powder acts as one bar-shaped permanent magnet. At this time, when a magnetic field is not applied to the SmFeN powder, as illustrated in FIG. 3, respective particles of the SmFeN powder lose their magnetic orientation due to a magnetic field denoted by the alternate long and short dash line. On the other hand, in the production method of the present disclosure, application of a magnetic field is continued at least until the middle of pressure sintering, and this facilitates cancellation of the magnetic field denoted by the alternate long and short dash line of FIG. 3, so that respective particles of the SmFeN powder can maintain their magnetic orientation. However, even if the cancellation of magnetic field is incomplete and part of the magnetic field denoted by the alternate long and short dash line of FIG. 3 remains, when a magnetic field is added in a direction different from the pressure direction of pressure sintering, loss of the magnetic orientation can be advantageously prevented. Although not bound by theory, the reason therefor is considered as follows. In the SmFeN powder, the particles are close to each other and when a pressure is imparted (applied) to the SmFeN powder in this state, respective particles are likely to flow in a direction different from the pressure direction. At his time, when a magnetic field is applied in a direction in which respective particles are likely to flow, i.e., a direction different from the pressure direction, respective particles flow while orientated (rotated) in the magnetic field application direction.

From the viewpoint of controlling particle rotation of the SmFeN powder, θ is preferably 10° or more, 20° or more, or 30° or more, more preferably 40° or more, 50° or more, or 60° or more, still more preferably 70° or more, 75° or more, 80° or more, or 85° or more, and most preferably 90°.

As long as the above-discussed requirements of magnetic field application are satisfied, the method for pressure sintering is not particularly limited, and a well-known method can be applied. The pressure sintering method includes, for example, a method where a mold having a cavity and a punch capable of sliding inside the cavity are prepared, the raw material powder is charged inside the cavity and while applying a pressure to the raw material powder by means of the punch, the raw material powder is sintered. In this method, typically, the mold and/or cavity are heated using a high-frequency induction coil. Alternatively, a Spark Plasma Sintering (SPS) method may also be used.

The pressure-sintering temperature, pressure-sintering pressure, and pressure-sintering time, etc. may be appropriately determined so that a sintered body can be obtained without causing decomposition of the magnetic phase of the SmFeN powder in the raw material powder. Here, in the following description, the pressure-sintering temperature, pressure-sintering pressure and pressure-sintering time are sometimes simply referred to as sintering temperature, sintering pressure and sintering time.

When the sintering temperature is 300° C. or more, particles of the SmFeN powder can interbond with one another. In the following description, the configuration of an embodiment where the raw material powder contains a zinc component-containing powder in addition to the SmFeN powder, and/or an embodiment where a zinc-containing coating is formed on the particle surface of the SmFeN powder, is sometimes referred to as "the raw material powder contains a zinc component". In the case where the raw material powder contains a zinc component, when the sintering temperature is 300° C. or more, Fe on the particle surface of the SmFeN powder and part of the zinc component are interdiffused to increase the bonding force between particles of the SmFeN powder to one another. The interdiffusion of Fe on the particle surface of the SmFeN powder with the zinc component may be solid-phase diffusion or may be liquid-phase diffusion. In view of interbonding between particles of the SmFeN powder to each other, the sintering temperature may be, for example, 310° C. or more, 320° C. or more, 340° C. or more, or 350° C. or more.

On the other hand, when the sintering temperature is 500° C. or less, 470° C. or less, or 450° C. or less, decomposition of the magnetic phase in the SmFeN powder can be avoided. In the case where the raw material powder contains a zinc component, when the sintering temperature is 430° C. or less, 420° C. or less, 410° C. or less, 400° C. or less, 390° C. or less, 380° C. or less, 370° C. or less, or 360° C. or less, excessive interdiffusion between Fe on the particle surface of the SmFeN powder and the zinc component of the modifier powder can be avoided.

As for the sintering pressure, a sintering pressure capable of increasing the density of the sintered body may be appropriately selected. Typically, the sintering pressure may be 100 MPa or more, 200 MPa or more, 400 MPa or more, 500 MPa or more, 600 MPa or more, 800 MPa or more, or 1,000 MPa or more, and may be 2,000 MPa or less, 1,800 MPa or less, 1,600 MPa or less, 1,500 MPa or less, 1,300 MPa or less, or 1,200 MPa or less.

The sintering time may be appropriately determined such that a sintered body can be obtained. The sintering time does not include the temperature rise time until reaching the heat treatment temperature. The sintering time may be, for example, 1 minute or more, 2 minutes or more, or 3 minutes or more, and may be 60 minutes or less, 50 minutes or less, 40 minutes or less, 30 minutes or less, 20 minutes or less, 10 minutes or less, or 5 minutes or less. In the case where the raw material powder contains a zinc component, the sintering time can be reduced, and the sintering time may be 30 minutes or less, 20 minutes or less, 10 minutes or less, or 5 minutes or less.

Upon elapse of the sintering time, the sintering is ended by cooling the sintered body. At a higher cooling rate, oxidation, etc. of the sintered body can be more suppressed. The cooling rate may be, for example, from 0.5 to 200° C./sec.

The atmosphere during pressure sintering is preferably an inert gas atmosphere so as to suppress oxidation of the raw material powder and sintered body. The inert gas atmosphere encompasses an argon gas atmosphere and/or a nitrogen gas atmosphere. Alternatively, the sintering may also be performed in a vacuum.

The raw material powder may be previously compression-molded to form a green compact before pressure sintering. The green compact is then pressure-sintered. As described hereinbefore, in the production method of the present disclosure, a magnetic field is applied to the raw material so as to impart magnetic orientation, and the application of magnetic field is continued to maintain the magnetic orientation at least until the middle of the pressure sintering. Therefore, in the case where the raw material powder is previously compression-molded before pressure sintering, a green compact may be formed by compression-molding the raw material powder while applying a magnetic field to the raw material powder. In the present description, unless otherwise indicated, such formation of a green compact is sometimes referred to as "in-field molding". The in-field molding is described in detail below.

<In-Field Molding>

The in-field molding enables imparting orientation to respective particles of the SmFeN powder in the green compact. When such a green compact is pressure-sintered, anisotropy can be imparted to the sintered body (rare earth magnet) and in turn, the residual magnetization can be enhanced.

The in-field molding method may be, for example, a well-known method such as a method of compression-molding the raw material powder by using a molding die having arranged therearound a magnetic field generating source. The molding pressure may be, for example, 10 MPa or more, 20 MPa or more, 30 MPa or more, 50 MPa or more, 100 MPa or more, or 150 MPa or more, and may be 1,500 MPa or less, 1,000 MPa or less, or 500 MPa or less. The time for which the molding pressure is applied may be, for example, 0.5 minutes or more, 1 minute or more, or 3 minutes or more, and may be 10 minutes or less, 7 minutes or less, or 5 minutes or less. The magnitude of the magnetic field applied may be, for example, 500 kA/m or more, 1,000 kA/m or more, 1,500 kA/m or more, or 1,600 kA/m or more, and may be 20,000 kA/m or less, 15,000 kA/m or less, 10,000 kA/m or less, 5,000 kA/m or less, 3,000 kA/m or less, or 2,000 kA/m or less.

The magnetic field generating source includes, for example, an electromagnetic coil and a permanent magnet, etc. These may also be used in combination.

In the case of using an electromagnetic coil as the magnetic field generating source, a static magnetic field or a pulsed magnetic field using an alternating current can be applied.

In the case of using a permanent magnet as the magnetic field generating source, the permanent magnet includes, for example, an alnico magnet, a ferrite magnet, and a rare earth magnet, etc. From the viewpoint of reducing the installation space and applying a strong magnetic field, a rare earth magnet is preferred. The rare earth magnet includes, for example, a samarium-cobalt magnet and a neodymium magnet, etc. Also, the applied magnetic field may be increased by arranging a soft magnetic material in the vicinity of the permanent magnet. The soft magnetic material includes, for example, permalloy, silicon steel plate, and permendur, etc. These may also be used in combination. From the viewpoint of increasing the applied magnetic field, permendur is preferred. The "vicinity" means a position at which the magnetic field generated by the permanent magnet can be increased.

In the case of using, as the magnetic field generating source, an electromagnetic coil and a permanent magnet in combination, this includes, for example, the following embodiment. A permanent magnet before magnetization is arranged around the SmFeN powder. An electromagnetic coil is further arranged outside the permanent magnet, and a magnetic field is applied to both the permanent magnet and the SmFeN powder by the electromagnetic coil. Then, the permanent magnet is magnetized by the magnetic field applied by the electromagnetic coil, and respective particles of the SmFeN powder are oriented.

The magnetic field application direction is not particularly limited. From the viewpoint that the SmFeN powder in a green compact is advantageously oriented, as with the case of pressure sintering, it is preferable to apply the magnetic field in a direction different from the compression molding direction. The angle between the compression molding direction and the magnetic field application direction may follow the above-described θ.

In order to prevent oxidation of the mixed powder, the magnetic-field molding is preferably performed in an inert gas atmosphere. The inert gas atmosphere encompasses an argon gas atmosphere and/or a nitrogen gas atmosphere.

<<Alteration>>

In the production method of the present disclosure, other than those described hereinbefore, various alterations can be added within the scope of contents as set forth in claims.

For example, a sintered body obtained by pressure-sintering the raw material powder may be heat-treated. When heat-treated, the particles of SmFeN powder are more strongly bonded together and at the same time, the modification is promoted. In the case where the SmFeN powder includes fine particles, elimination of the adverse effect of fine particles is promoted.

The heat treatment temperature may be, for example, 350° C. or more, 360° C. or more, 370° C. or more, or 380° C. or more, and may be 410° C. or less, 400° C. or less, or 390° C. or less. The heat treatment time may be 3 hours or more, 4 hours or more, 5 hours or more, 8 hours or more, 10 hours or more, 12 hours or more, 15 hours or more, 17 hours or more, or 20 hours or more, and may be 40 hours or less, 35 hours or less, 30 hours or less, 25 hours or less, or 24 hours or less. In order to prevent oxidation of the sintered body, the sintered body is preferably heat-treated in a vacuum or an inert gas atmosphere. The inert gas atmosphere encompasses an argon gas atmosphere and/or a nitrogen gas atmosphere.

EXAMPLES

The production method of the present disclosure is described more specifically below by referring to Examples and Comparative Examples. The production method of a rare earth magnet of the present disclosure is not limited to the conditions employed in the following Examples.

Preparation of Sample

Samples of Examples 1 and 2 and Comparative Examples 1 to 3 were prepared in the following manner.

Example 1

A SmFeN powder and a zinc component-containing powder were prepared. As for the SmFeN powder, a commercially available product (Z21 produced by NICHIA CORPORATION) was used. $D_{50}$ of the SmFeN powder was 3.08 μm. The zinc component-containing powder was a metallic zinc powder, and the purity thereof was 99.9 wt %. Also, $D_{50}$ of the metallic zinc powder was 0.5 μm.

The SmFeN powder and the zinc component-containing powder were mixed to obtain a raw material powder. The content ratio of zinc component relative to the entire raw material powder, i.e., the mixing ratio of the zinc component-containing powder, was 10 mass %.

The raw material powder was charged into the cavity of the molding die, and furthermore, as illustrated in FIG. 7, a neodymium-based magnet was arranged in the cavity as a permanent magnet before magnetization. Using an electromagnetic coil, a magnetic field was applied to the raw material powder and the neodymium magnet over 1 minute, and after magnetization of the neodymium magnet, the application of magnetic field by the electromagnetic coil was stopped. Thereafter, the raw material powder was pressure-sintered. The angle θ between the pressure direction of pressure sintering and the direction of magnetic field applied by the electromagnetic coil was roughly 90°.

The magnetic field application method using the electromagnetic coil and the magnitude of the magnetic field were as shown in Table 1. In Table 1, when the "in-field molding pressure" is denoted by "-", this means that a pressure is not imparted to the raw material powder until the start of pressure sintering. Charging of the raw material into the molding die and the application of magnetic field by the electromagnetic coil were performed in a nitrogen atmosphere. The pressure sintering was performed in an argon atmosphere, and various pressure sintering conditions were as shown in Table 1. Also, AC demagnetization was not performed throughout all steps. The thus-obtained sintered body was used as the sample of Example 1.

Example 2

The sample of Example 2 was obtained in the same manner as in Example 1 other that the permanent magnet before magnetization was a samarium-cobalt-based magnet.

Comparative Example 1

The sample of Comparative Example 1 was prepared in the same manner as in Example 1 other that a permanent magnet was not arranged in the molding die. Incidentally, the application of magnetic field by the electromagnetic coil was stopped before the start of pressure sintering.

Comparative Example 2

The sample of Comparative Example 2 was prepared in the same manner as in Example 1 other that a permanent magnet was not arranged in the molding die, the magnetic field applied was a static magnetic field, a green compact was obtained by in-field molding in advance before pressure sintering, the green compact was subjected to AC demagnetization, and the green compact after AC demagnetization was pressure-sintered. The in-field molding pressure was 50 MPa. Incidentally, the application of magnetic field by the electromagnetic field was stopped before subjecting the green compact to AC demagnetization.

Comparative Example 3

The sample of Comparative Example 3 was prepared in the same manner as in Example 1 other that a permanent magnet was not arranged in the molding die, the magnetic field applied was a static magnetic field, a green compact was obtained by in-field molding in advance before pressure sintering, and the green compact was pressure-sintered.

<<Evaluation>>

Magnetic properties of each sample were measured. The magnetic properties were measured at room temperature using a vibrating sample magnetometer (VSM). The degree of orientation was calculated by the above-described method.

The evaluation results are shown in “Magnetic Properties” of Table 1. It could be confirmed from Table 1 that in the samples of Examples 1 and 2, a good degree of orientation of 0.95 or more was obtained. It is considered that in Examples 1 and 2, since a permanent magnet was arranged in the cavity of the molding die, even after the application of magnetic field by the electromagnetic coil was stopped, the application of magnetic field to the raw material powder could be continued at least until the middle of pressure sintering and, as a result, the magnetic orientation of the SmFeN powder in the raw material powder could be maintained.

On the other hand, it could be confirmed from Table 1 that in the samples of Comparative Examples 1 and 3, a good degree of orientation was not obtained. It is considered that in Comparative Examples 1 and 3, since a permanent magnet was not arranged in the cavity of the molding die, after the application of magnetic field by the electromagnetic coil was stopped, a magnetic field was not externally applied to the SmFeN powder of the raw material powder and consequently, even when the SmFeN powder in the raw material was once oriented as a result of the application of magnetic field by the electromagnetic coil, the orientation was disturbed by a magnetic field formed by the entire SmFeN powder of the raw material powder.

Also, it could be confirmed from Table 1 that in the sample of Comparative Example 2, despite no arrangement of a permanent magnet in the cavity of the molding die, a relatively good degree of orientation was obtained. The reason therefor is considered as follows. In Comparative Example 2, after the application of magnetic field by the electromagnetic coil is stopped, the magnetism remaining in the SmFeN powder is removed by AC demagnetization. As a result, it is difficult for the entire SmFeN powder of the raw material powder to form a magnetic field, and the SmFeN powder in the raw material powder, which was once oriented by the application of magnetic field using an electromagnetic coil, is thought likely to maintain its orientation. However, compared with the samples of Examples 1 and 2, the degree of orientation of the sample of Comparative Example 3 is slightly low. Even by performing AC demagnetization, it is difficult to completely remove the magnetic force remaining in the SmFeN powder in the raw material powder. Even assuming that the magnetic force remaining in the SmFeN powder in the raw material powder can be completely removed by AC magnetization, a small but certain magnetic field formed by the entire SmFeN powder is generated until the removal of magnetic force is completed. It may be deduced therefrom that even if the SmFeN powder in the raw material powder is once oriented by the application of magnetic field using an electromagnetic coil, the orientation is somewhat disturbed.

TABLE 1

| | | Zinc Component-Containing Powder | | Application of Magnetic Field | | | | |
|---|---|---|---|---|---|---|---|---|
| | SmFeN Powder $D_{50}$ (μm) | Kind | Mixing Amount (mass %) | Applied Magnetic Field (kA/m) | Magnetic Field Application Method | Use of Permanent Magnet | In-Field Molding Pressure (MPa) | AC Demagnetization |
| Example 1 | 3.08 | metallic zinc | 10 | 1600 | pulsed | neodymium magnet | — | none |
| Example 2 | 3.08 | metallic zinc | | 1600 | pulsed | samarium-cobalt magnet | — | none |
| Comparative Example 1 | 3.08 | metallic zinc | 10 | 1600 | pulsed | none | — | none |
| Comparative Example 2 | 3.08 | metallic zinc | 10 | 1600 | static magnetic field | none | 50 | done |
| Comparative Example 3 | 3.08 | metallic zinc | 10 | 1600 | static magnetic field | none | 50 | none |

TABLE 1-continued

| | Pressure Sintering | | | Magnetic Properties | |
|---|---|---|---|---|---|
| | Temperature (° C.) | Pressure (MPa) | Time (min) | Degree of Orientation | Residual Magnetization (T) |
| Example 1 | 380 | 500 | 30 | 0.95 | 0.87 |
| Example 2 | | | | 0.96 | 0.89 |
| Comparative Example 1 | 380 | 500 | 30 | 0.70 | 0.75 |
| Comparative Example 2 | | | | 0.94 | 0.85 |
| Comparative Example 3 | | | | 0.81 | 0.77 |

The effects of the production method of the present disclosure could be confirmed from the results above.

REFERENCE SIGNS LIST

10 SmFeN powder
20 Bar-shaped permanent magnet
30 Magnetic field generating source
100 Rotary kiln furnace
110 Stirring drum
120 Material storing part
130 Rotary shaft
140 Stirring plate
150 SmFeN powder
160 Zinc component-containing powder
171 First heat-treatment furnace
172 Second heat-treatment furnace
173 Connection path
180 Vacuum pump
181 First container
182 Second container

The invention claimed is:

1. A production method of a rare earth magnet, comprising:

preparing a raw material powder containing a magnetic powder having a magnetic phase which contains Sm, Fe and N and at least partially has a crystal structure of at least either $Th_2Zn_{17}$ or $Th_2Ni_{17}$, positioning a permanent magnet with the raw material powder and applying a magnetic field to the permanent magnet and the raw material powder with an electromagnetic coil, and pressure-sintering the raw material powder, wherein magnetic orientation is imparted to the raw material powder by applying the magnetic field before the pressure sintering, an application of the magnetic field is continued to maintain the magnetic orientation until interbonding among particles of the SmFeN powder develops and the pressure sintering is completed, the magnetic field is applied in a direction perpendicular to the pressure direction of the pressure sintering, and the magnetic field applied to the raw material powder has a magnitude of 500 kA/m or more and 20,000 kA/m or less.

2. The production method of a rare earth magnet according to claim 1, wherein the raw material powder further contains a zinc component-containing powder.

3. The production method of a rare earth magnet according to claim 1, wherein a zinc component-containing coating is formed on the particle surface of the magnetic powder.

4. The production method of a rare earth magnet according to claim 1, wherein a green compact is formed before the pressure sintering by compression-molding the raw material powder while applying a magnetic field and the green compact is pressure-sintered.

5. The production method of a rare earth magnet according to claim 1, wherein the magnetic field applied to the raw material powder has a magnitude of 1,600 kA/m or more and 20,000 kA/m or less.

* * * * *